(12) United States Patent
Reudink et al.

(10) Patent No.: US 6,405,018 B1
(45) Date of Patent: Jun. 11, 2002

(54) INDOOR DISTRIBUTED MICROCELL

(75) Inventors: Douglas O. Reudink, Kirkland; Donglin Shen, Bellevue; Robert N. Shuman, Medina, all of WA (US)

(73) Assignee: Metawave Communications Corporation, Redmond, WA (US)

( * ) Notice: Subject to any disclaimer, the term of this patent is extended or adjusted under 35 U.S.C. 154(b) by 0 days.

(21) Appl. No.: 09/229,492

(22) Filed: Jan. 11, 1999

(51) Int. Cl.[7] .................. H04B 7/14; H04B 1/38; H04M 1/00
(52) U.S. Cl. .................. 455/20; 455/560; 455/562
(58) Field of Search .................. 455/561, 562, 455/422, 522, 69, 7, 11.1, 20, 560

(56) References Cited

U.S. PATENT DOCUMENTS

| | | | |
|---|---|---|---|
| 5,267,262 A | * 11/1993 | Wheatley, III | 455/69 |
| 5,345,598 A | 9/1994 | Dent | 455/54.1 |
| 5,349,631 A | * 9/1994 | Lee | 455/463 |
| 5,564,121 A | 10/1996 | Chow et al. | 455/53.1 |
| 5,613,217 A | 3/1997 | Hagström et al. | 455/67.1 |
| 5,628,052 A | * 5/1997 | DeSantis et al. | 455/562 |
| 5,682,256 A | 10/1997 | Motley et al. | 359/117 |
| 5,832,363 A | * 11/1998 | Moriya et al. | 455/11.1 |
| 6,035,218 A | * 3/2000 | Oh et al. | 455/562 |
| 6,038,272 A | * 3/2000 | Golden et al. | 455/561 |
| 6,070,071 A | * 5/2000 | Chavez et al. | 455/562 |
| 6,108,323 A | * 8/2000 | Gray | 455/562 |
| 6,148,218 A | * 11/2000 | Solondz | 455/562 |
| 6,195,566 B1 | * 2/2001 | Kanai | 455/562 |

FOREIGN PATENT DOCUMENTS

| | | | |
|---|---|---|---|
| EP | 0725498 | 1/1996 | H04B/7/04 |
| EP | 0884915 | 6/1998 | H04Q/7/26 |

OTHER PUBLICATIONS

PCT International Search Report dated May 3, 2000.
Sheldon Meredith and Andrew Crowley, "Antenna Technique Boosts Capacity and Coverage, Reduces Interference: Electronically controlled, directive antennas help cellular site operators to reduce interference, increase capacity, improve coverage (both in–building and rural) and optimize hand–offs.", Apr. 1997, pp. 80, 82, 84, 86 and 88.

* cited by examiner

*Primary Examiner*—Nguyen T. Vo
(74) *Attorney, Agent, or Firm*—Fulbright & Jaworski L.L.P.

(57) ABSTRACT

A cellular micro-cell is deployed within a building or other structure to provide wireless communication services therein. Accordingly, a plurality of antennas are deployed such that their area of influence illuminates the desired service area, Each antenna is in selective communication with various inputs/outputs of the micro-cell base transceiver station radio in order to allow mobile subscriber units to move throughout the service area without necessitating handoff conditions. Additionally, as the antennas may be selectively coupled to the transceiver inputs, all channels of the micro-cell may be made available throughout the entire service area thus providing increased capacity in all regions of the service area.

3 Claims, 4 Drawing Sheets

INDOOR DISTRIBUTED MICROCELL

BACKGROUND

As wireless communication services become more popular, the need for providing wireless communication services where those desiring such services may be located also increases. Moreover, such wireless service demand increases introduce problems in providing enough capacity in areas where such wireless communication services are provided.

In order to provide for free roaming wireless telephone communications wireless cellular telephone networks have been deployed throughout many populated areas. Such systems rely on the use of predefined areas of channel reuse in order to utilize a limited amount of radio frequency spectrum in serving a particular capacity of wireless communications. Accordingly, radiation of a particular communication channel is limited to within a particular area associated with a cellular base transceiver station (BTS).

Such systems generally suffer from coverage gaps or holes where a particular BTS is unable to radiate a signal or channel with attributes suitable for use in conducting communications over the network due to such obstructions as large buildings. Often it is difficult or impossible to sufficiently fill in these gaps with signals radiated from adjacent BTSs of the cellular network because of resulting problems with overlapping radiation patterns in areas unaffected by the obstruction, multiple obstructions such as buildings in a metropolitan area blocking signals from multiple adjacent BTSs, and the like.

Moreover, often the areas associated with such gaps in communication service coverage are areas of more dense congregation of those desiring such wireless services. For example, large numbers of persons desiring to use wireless mobile subscriber units (MSU) may be present within urban buildings which are shaded from signals radiated from BTSs of a communication network by the structure of the building itself or other buildings located in the communication path.

Similarly, although within an area providing suitable communication with a BTS of a cell encompassing such a building, the concentration of persons desiring wireless communication services may demand capacity not available from such a cell. Accordingly, enhanced capacity may be provided by disposing a cell, or microcell, to service such a concentration, i.e., a cell disposed to service communications associated with MSUs located within or near a high rise office tower.

Accordingly, solutions have been offered which deploy antennas, coupled to a transceiver of a communication network, within buildings in order to provide wireless communication services therein. However, such prior art solutions have often been limited to combining the signals of all or a plurality of the antennas disposed in the building and providing the combined signals to the transceivers. Such an approach suffers from disadvantages such as the signal provided to each transceiver includes the noise initially present on only one or a few antennas, such as a particular interfering signal from outside the building, because the antenna signals are combined. Moreover, the sum of such noise being present on multiple ones of the antennas can result in the noise exceeding limits for an acceptable carrier to interference (C/I) ratio. Accordingly, the number of such antennas is generally limited to a small number in order to maintain a desired signal quality level. Additionally, due to the signal loss issues associated with the antenna feed network of these prior art systems, the deployment of these prior art antennas is limited to relatively short distances from the associated transceiver.

In order to overcome some of the above described problems, other prior art systems have utilized transceivers distributed throughout the communication coverage area, i.e., deployed throughout a building in which communication is to be provided. However, such a solution presents substantial disadvantages also. Specifically, by definition such a solution requires multiple, and often expensive, transceivers to be deployed in order to provide communications in more than one area of the building. Moreover, the deployment of multiple transceivers capable of communicating on a same channel in order to provide this channel within multiple portions or an increased portion of the area serviced involves the inefficient use of such transceivers and/or channels. Furthermore, the use of such transceivers does not readily provide capacity for multiple simultaneous communications within a particular area without deploying multiple ones of the transceivers to provide communications within each such area, thus further aggravating inefficiencies associated with the deployment of transceivers throughout the service area. Additionally, the distributed deployment of transceivers substantially complicates the control mechanism required to operate such a communication network in addition to requiring added communication paths including control signal paths for each transceiver.

Accordingly, a need exists in the art for a wireless communication system adapted to provide communication within a limited area of service, such as within a building, wherein antenna signals are maintained distinct while providing efficient use of transceiver equipment, including allowing for the use of an assigned channel to "follow" the movement of a unit in communication with a particular transceiver as the unit moves from the coverage area of one antenna to that of another and/or providing dynamic capacity availability to address capacity demand changes within the area of service. A further need exists in the art for such a system to be adapted to utilize a number of antennas sufficient to provide a desired cumulative area of coverage even where physical barriers, such as floors or walls of the aforementioned building, prevent each individual antenna from providing coverage within a substantial portion of the total area to be covered.

Additionally, a need exists in the art for the wireless communication system to be adapted to require a minimum of signal paths as between the antennas and transceiver equipment in order to provide the desired communications. A still further need exists in the art for such signal paths to allow for the disposal of antennas a substantial distance from transceiver equipment coupled thereto.

SUMMARY OF THE INVENTION

These and other objects, features and technical advantages are achieved by a system and method which utilizes a plurality of antennas strategically deployed throughout an area to be provided wireless communication service and coupling such antennas to transceiver equipment, i.e., radios, of a BTS or BTSs such that a particular antenna may be selected for communication of a particular transceiver signal. Accordingly, the transceivers of the BTS may be centrally located and thus easily centrally controlled and/or coupled to additional components of the communication network such as a public switched network (PSN) or mobile switching office (MSO). Moreover, as transceivers of the BTS may selectively communicate via ones of the plurality of antennas, efficient use may be made of such transceivers.

For example, a single transceiver may be deployed for each channel of a plurality of channels utilized by such a communication system and yet communications may be established and maintained on a particular channel throughout all or a substantial portion of the coverage area utilizing only a single transceiver associated with this particular channel.

The preferred embodiment of the present invention utilizes switched beam or smart antenna technology in order to provide a plurality of antenna beams throughout the area to be covered which may then be selectively utilized by ones of the BTS radios. Accordingly, directional, either fixed beam or adaptive array, antennas are placed throughout the area to be covered, such as by deploying multiple antennas on each floor of a building and directing their antenna beams to illuminate substantially only areas within the building. As MSUs, or other wireless communication units including fixed subscriber units (FSUs), initiate or accept communications, a particular antenna having a radiation pattern encompassing the subscriber unit may be selected for use in servicing the communication. A controller operating according to the present invention may then provide the signal of this antenna to a proper BTS transceiver, i.e., a transceiver adjusted to communicate via a channel corresponding to that of the MSU, in order that a communication link is established/maintained. Preferably, as the MSU moves within the coverage area of the BTS or other events occur which affect the wireless link between the aforementioned antenna and MSU, such that another antenna of the plurality coupled to the BTS provides a more suitable wireless link with the MSU, the controller operates to provide the signal of this second antenna to the proper BTS transceiver. Accordingly efficient use may be made of each BTS transceiver as the transceivers may be utilized for servicing communications throughout substantial portions, if not all, of the area serviced by the BTS. Moreover, as only selected antenna signals are provided to such transceivers, the quality of such communications may be maintained with reduced amounts of noise as compared to prior art systems.

It should be appreciated that the antennas of the preferred embodiment described above may be utilized to service more than a single MSU. For example, where multiple MSUs are located within an area encompassed by the radiation pattern of one antenna of the present invention, the controller may provide the signal of this antenna to multiple BTS transceivers, i.e., a transceiver adjusted to communicate via a first channel (whether a frequency division channel, time division channel, code division channel, or otherwise) corresponding to that of the first MSU and a transceiver adjusted to communicate via a second channel (also whether a frequency division channel, time division channel, code division channel, or otherwise) corresponding to that of the second MSU. Likewise, where MSUs in communication with a same transceiver of the BTS are located within areas encompassed by the radiation patterns of different antennas of the present invention, the controller may provide the signal of each of these antennas to a single BTS transceiver, i.e., a transceiver utilizing different time division channels of a frequency associated with this transceiver to communicate with multiple MSUs may be coupled to multiple ones of the antennas either persistently throughout the communications with these units or in synchronization with the use of the appropriate channel. Accordingly, the present invention efficiently provides increased communication capacity throughout all portions of the service area.

A preferred embodiment of the present invention deploys at least a portion of the antennas utilized along the outer periphery of the service area, such as at the corners of each floor within a building to be provided with communication services. Accordingly, the communicated signals will be directed within the service area providing less interference to wireless systems outside the service area as well as accepting less interference from outside the service area.

Moreover, as users of MSUs operating therein may generally expect such communication services to be provided from sources external to the actual service area, i.e., cellular towers disposed external to a building within which they are operating, these users may be prone to migrating toward the periphery of the service area in an effort to achieve improved signal quality. Deployment of antennas along such periphery allows MSU transmission powers to be reduced as the MSUs migrate toward the periphery of the service area. Accordingly, when operating in areas most likely to result in transmitted signals being sufficient to interfere with wireless systems outside the service area, the transmission levels of a preferred embodiment are reduced to mitigate such interference. Moreover, as these MSUs are by definition closing the air gap between the MSU and a communication system antenna by migrating to the periphery of the service area, the system signal strength as received by the MSU may be improved with respect to an interfering signal associated with wireless systems outside the coverage.

According to one embodiment of the present invention, preamplifiers are disposed in the BTS receive signal path at a point near ones of the antennas. Therefore received signals may be amplified for transmission over a somewhat lengthy or otherwise lossy cable. Accordingly, antennas of this preferred embodiment may be disposed relatively large distances from the associated transceiver equipment. As such, wireless communications may be provided in areas located significant distances from the transceiver, such as in the upper floors of a high rise office tower, while allowing centralized deployment and control over a plurality of transceivers, such as may be deployed in a basement mechanical closet of the high rise office tower. Additionally, or alternatively, use may be made of lossier cable, i.e., less expensive cable, interconnecting the antennas and transceivers or transmission cable which is already available within the area to be served with wireless communications, i.e., computer systems networking cable deployed within a structure.

Additionally or alternatively, a preferred embodiment of the present invention utilizes frequency conversion in the signal paths near the antennas to convert received/transmitted signals to/from system native radio frequencies (RF) and intermediate frequencies (IF). Likewise, frequency conversion is utilized in the signal paths near the transceivers to convert the received/transmitted signals to/from RF and IF. Accordingly, by using a different IF for the RF signal received at ones of the antennas, some or all the antenna signals may be multiplexed onto a single signal path, i.e., a single coax. Moreover, by proper selection of the IFs used, ones of the antenna signals may be combined on an existing signal path which is also utilized by another communication service, such as the aforementioned computer systems networking cable.

According to this embodiment of the present invention, antenna selection for each transceiver may be accomplished by selecting a local oscillator (LO) frequency which up converts only that IF corresponding to the antenna selected to the exact carrier frequency that the transceiver serving a particular MSU is tuned for. This operation may be performed for multiple antenna beams with respect to a single transceiver, such as on a time slot by time slot basis for time division multiple access systems (TDMA) as TDMA MSUs may be dispersed throughout the coverage area yet each is served by the best antenna. Multiple antennas may be placed in communication with a single transceiver, to provide the multiple access techniques described above or for other purposes such as to provide signal diversity, by tuning the LO of multiple antennas to a common frequency.

With respect to the transceiver transmit signals, each transceiver may have a particular IF associated therewith such that multiple signals are combined for communication through a single cable. Accordingly, a particular antenna or antennas may be selected for transmission of a transceiver signal by selecting a LO frequency which up converts only that IF corresponding to this particular transceiver in order to radiate the transceiver's signal within a desired portion of the coverage area. If more than one carrier is to be transmitted from a single antenna or combination of antennas, the LOs associated with these transceivers may down convert these carriers within the same IF band, thus allowing selection of a corresponding LO at the antenna for up conversion of all of these carrier frequencies.

Of course, there is no limitation to the use of a common signal path, i.e., the use of IFs for the combining of signals on a single cable, in both the transmit and receive signal paths. For example, a common cable may be utilized in the receive signal path and individual cables utilized in the transmit signal path, if desired.

The use of IFs as in the above described preferred embodiment provides advantages where substantial distances are present between antennas and transceivers. As lower cost transmission cable may often be utilized in providing a signal path for lower frequency communications, down conversion of the system native RF frequencies to a lower IF frequency is utilized by a preferred embodiment of the present invention in order to provide for cost effective communication of such signals over distances such as those of the above described high rise office tower. An alternative embodiment of the present invention utilizes conversion between the system native RF and lightwave signals for transmission through low-loss fiber.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which.

DETAILED DESCRIPTION

Figure 1:
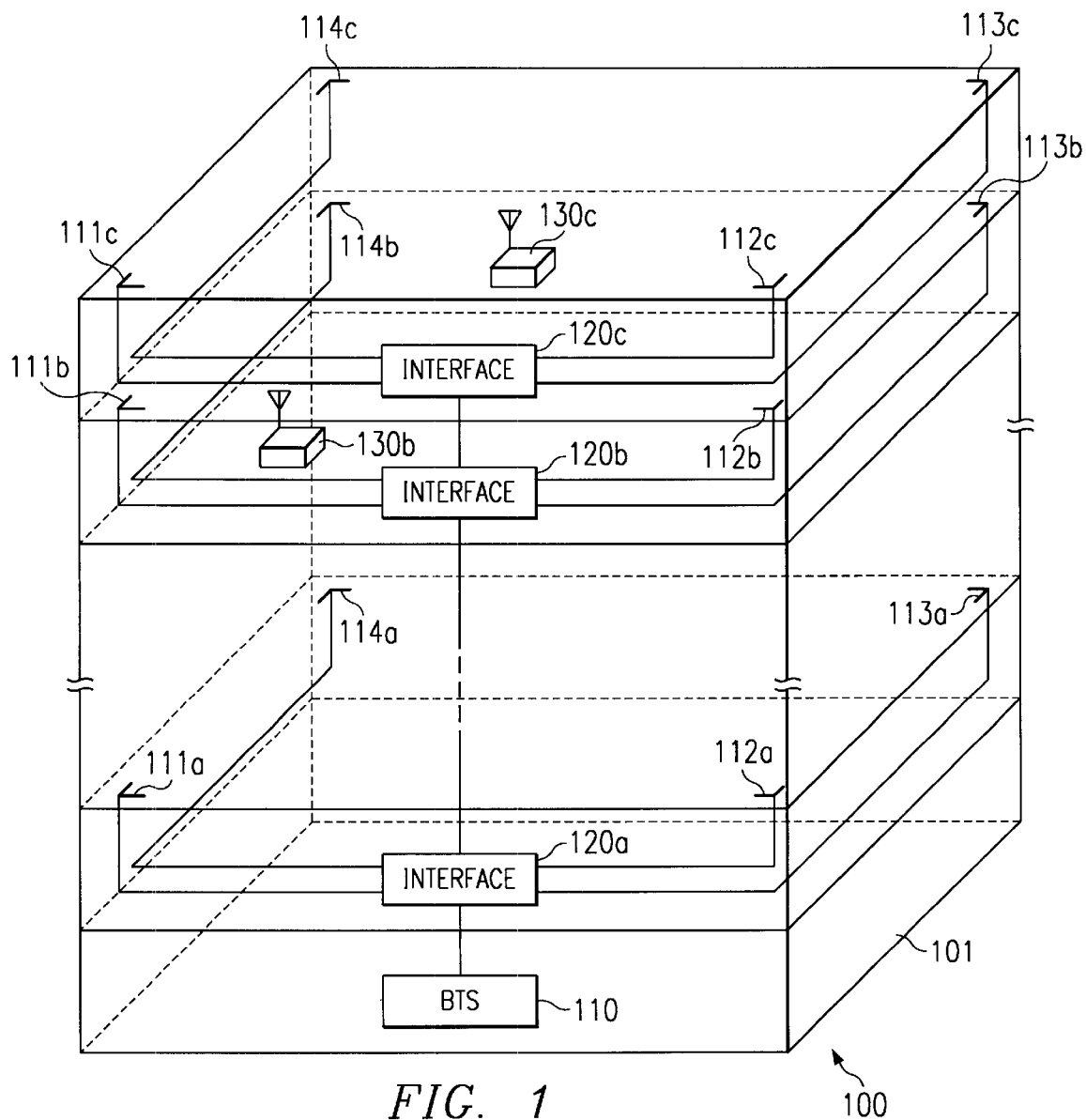
FIG. 1 illustrates a high level block diagram of the present invention deployed to provide wireless communication services in a service area substantially co-extensive with the interior volume of a high rise office tower.

Directing attention to FIG. 1, a high level block diagram of system 100 employing concepts of the present invention is shown deployed to provide wireless communications within a desired service area, here building 101. Accordingly, base transceiver station (BTS) 110 is coupled to a plurality of antennas, shown here as antennas 111a–114a, 111b–114b, and 111c–114c, which are disposed at various locations throughout building 101, in order to communicate with wireless communication devices operable within building 101, such as mobile subscriber units (MSUs) 130b and 130c. It should be appreciated that BTS 110 may be a portion of a communication network including multiple service areas having other BTSs associated therewith. For example, BTS 110 may be a cell site or microcell site BTS of a cellular telephone communication network wherein other cells and/or microcells are deployed throughout a geographic area, also having BTSs associated therewith, in order to provide substantially uninterrupted cellular telephone service through the geographic area. Additionally or alternatively, BTS 110 may be associated with a private communication system, such as a wireless private branch exchange (PBX) or other qualified communication system.

In order to provide communication coverage having desired signal attributes on ones of the various floors of building 101, the preferred embodiment includes antennas disposed throughout ones of these floors as shown in FIG. 1. Preferably, at least a portion of the antennas of the present invention are deployed along the outer periphery of the service area, such as at the corners or along the exterior walls of each floor of building 101. Accordingly, by utilizing directional antennas, i.e., antennas providing an antenna beam substantially limited to within at least a portion of the service area, the communicated signals will be directed within the service area, thus providing less interference to wireless systems outside the service area as well as accepting less interference from outside the service area.

Moreover, users of MSUs operating within building 101 may often operate the units at or near the periphery of the service area. For example, such users generally expect communication services to be provided from sources external to the actual service area in the case of high rise office towers, i.e., cellular towers disposed external to building 101. Therefore, these users may be prone to migrating toward the periphery of the service area in an effort to achieve improved signal quality. Deployment of antennas along such periphery may be utilized to provide improved signal quality at the MSU as these MSUs are reducing the air gap between the MSU and a communication system antenna in communication therewith by migrating to the periphery of the service area. Accordingly, the system signal strength as received by the MSU, and therefore a carrier to noise ratio, may be improved with respect to interfering signals associated with wireless systems outside the coverage as the strength of these interfering signals should not increase at the rate of the communication system's signal strength increase due to the close proximity of the periphery antennas.

Additionally, deployment of antennas along the periphery of the service area provides advantages in that such an arrangement allows MSU transmission powers to be reduced, such as is common in operation of mobile units in digital cellular communication systems, as the MSUs migrate toward the periphery of the service area. Accordingly, when operating in areas most likely to result in transmitted signals being sufficient to interfere with wireless systems outside the service area, i.e., other cells of a cellular network of which BTS 110 is a part, the transmission levels of a preferred embodiment are reduced to mitigate such interference.

In addition to the above mentioned advantages of disposal of antennas at the periphery of the service area, advantages may be realized in the physical deployment of the preferred periphery antennas. For example, when utilized to provide wireless communication services within the aforementioned high rise office tower, it may be necessary to deploy such antennas and their associated cabling after such a building has been erected. Accordingly, deployment of the antennas may be accomplished by attaching the antennas to the exterior of the building, such as within an aesthetically pleasing radome structure, and the associated cabling routed along the face of the building, such as within a seam or expansion joint, thus simplifying the deployment as the exterior surfaces may be more readily accessible.

Although the antennas of FIG. 1 are shown deployed only along the periphery of the service area, it should be appreciated that antennas may be deployed at other locations of the service area according to the present invention, if desired. For example, additional antennas may be added to the interior spaces of the floors of building 101 in order to provide a suitable signal within interior spaces which may not be adequately illuminated by other antennas. Additionally, or alternatively, antennas may be deployed in order to provide communication services to particular pre-defined areas or situations. For example, as building 101 may include elevators and thus elevator shafts which are not generally well suited for the passing of radio frequency signals, particular antennas may be deployed within the elevator shafts in order to provide suitable wireless communications therein. Moreover, as elevators are often highly mobile, i.e., covering a number of floors in a very short time, antennas deployed within such shafts may be adapted to move, such as by coupling to the elevator car itself, in order to provide communications therein without requiring a substantial amount of controller overhead to continuously hand-off communications between antennas of the various floors.

As shown in FIG. 1, the antennas utilized according to the present invention are coupled to the BTS transceivers through an interface, shown here as interfaces 120a–120c. It should be appreciated that the illustration of the interface in FIG. 1 is provided to aid in understanding the present invention and the distributed configuration shown, i.e., individual interfaces 120a, 120b, and 120c for each of the floors of building 101, is not a limitation of the present invention. Indeed, particular embodiments of the present invention utilize a centralized or substantially centralized interface in order to couple the antennas and BTS operating according to the present invention as will be more readily appreciated from the discussion herein below.

Figure 2A:
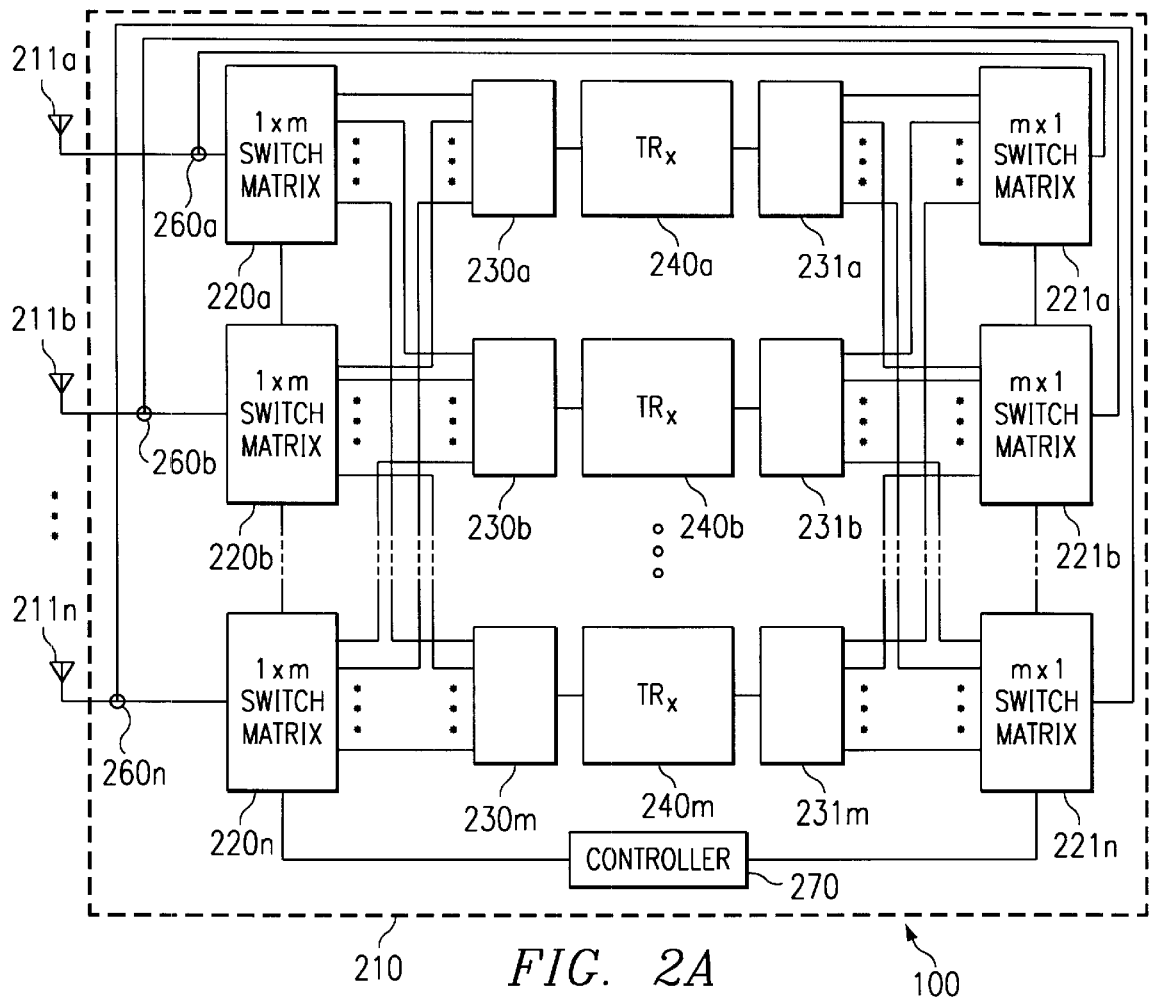
FIG. 2A shows a schematic diagram of a preferred embodiment of communication circuitry adapted according to the present invention.

Directing attention to FIG. 2A, a schematic diagram of a preferred embodiment of the present invention is shown. In FIG. 2A, BTS 210, similar to BTS 110 of FIG. 1 although the componentry of interfaces 120a–120c of FIG. 1 is included therein, is coupled to a plurality of antennas, shown as antennas 211a–211n, which may include antennas disposed in various groupings such as antennas 111a–114a, 111b, 114b, and 111c–114c of FIG. 1. As will be explained in detail below, the circuitry of FIG. 2 is substantially passive and is therefore preferable for use in situations wherein antennas 211a–211n are deployed relatively near to BTS 210, i.e., the antennas are spatially separated from the transceiver equipment of the BTS approximately 50–100 meters when frequencies typically used in cellular communication are used.

It should be appreciated that the subscript "n" as used in the figures is utilized to represent any desired number of antennas deployed according to the present invention and is not intended to be limiting to any particular number. Likewise, the subscript "m" as used in the figures is utilized to represent any desired number of transceivers or communications channels, i.e., transceivers which are each associated with a particular frequency channel or communications channels assignable to discrete users such as a frequency division channel, a time division burst, a code division chip code, or the like, utilized by the BTS and is not intended to be limiting to any particular number.

In order to couple the received antenna beam signal of selected ones of antennas 211a–211n to particular ones of transceivers 240a–240m, switch matrixes 220a–220n are disposed there between. In the embodiment of FIG. 2A, any antenna beam signal associated with antennas 211a–211n may be coupled to any of transceivers 240a–240m. Accordingly, 1×m (one input and m outputs) switch matrixes 220a–220n are provided to couple any antenna beam n to any transceiver m. Of course, combinations of switch matrixes other than the discrete switch matrixes illustrated in FIG. 2A may be utilized as described in further detail below, if desired.

The preferred embodiment illustrated in FIG. 2A utilizes signal combiners 230a–230m in order to couple the antenna beam signals as switchably passed by switch matrixes 220a–220n to transceivers 240a–240m. Additionally, combiners 230a–230m may be utilized to combine the antenna beam signal of multiple ones of antennas 211a–211n to a single transceiver where advantages may be realized by combining multiple antenna beam signals for input into the transceivers, such as where code division multiple access (CDMA) is utilized and multiple diverse signals are desired at a single transceiver input or where time division multiple access (TDMA) is utilized and time divided MSUs are operating in the antenna beams of multiple antennas. The use of delays in the signal paths of various ones of the antennas and/or various antenna diversity techniques, such as shown and described in the abovereferenced patent application entitled "Diversity Among Narrow Antenna Beams," may be utilized to enhance communications utilizing multiple antenna beams, if desired. Moreover, it should be appreciated that operation of the switch matrixes according to the present invention may be utilized to couple the signals of multiple MSUs, such as the above mentioned time divided MSUs, operating in the antenna beams of multiple antennas to a particular transceiver interface, such as on a time slot by time slot basis for TDMA systems.

Although not shown in the schematic diagram of FIG. 2A, the present invention may utilize transceiver equipment having diversity inputs and, accordingly, the system may operate to switchably couple a first antenna to one diversity input and a second antenna to another diversity input of each transceiver. Of course such an embodiment will utilize switch matrix apparatus providing signal paths associated with the diversity inputs of such transceiver equipment as will be readily appreciated by one of ordinary skill in the art.

Figure 2B:
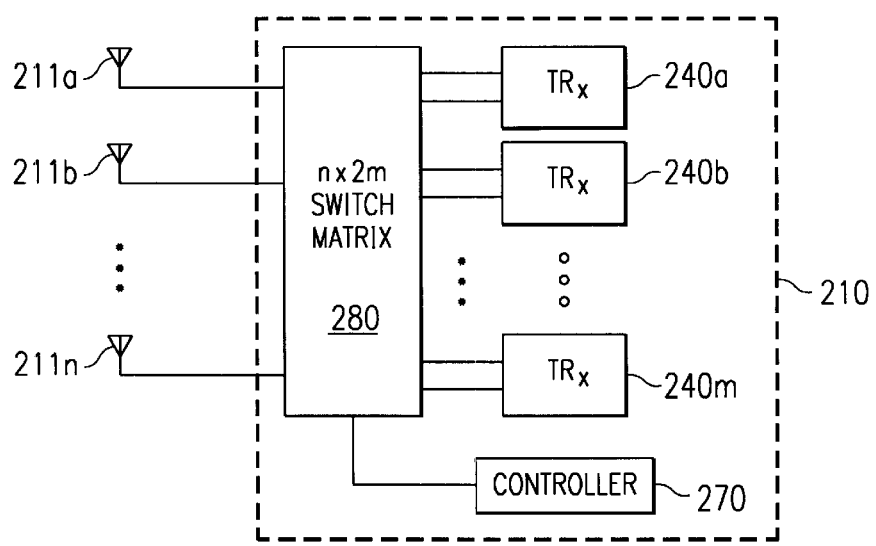
FIG. 2B shows a schematic diagram of a portion of the circuitry of FIG. 2A adapted according to an alternative preferred embodiment of the present invention.

Directing attention to FIG. 2B, a preferred embodiment receive signal path adapted according to the present invention including diversity inputs is shown. Accordingly, each of transceivers 240a–240m include multiple inputs coupled to antennas 211a–211n through switch matrix 280.

It should be appreciated that the switch matrix of FIG. 2B is somewhat simplified over the combination of switch matrixes and combiners of the embodiment of FIG. 2A. As described above, various switch matrix arrangements may be utilized according to the present invention. Switch matrix 280 of FIG. 2B provides selectable signal paths between n antenna inputs and 2 m transceiver outputs (m transceivers each having 2 inputs for diversity). However, the combiners of FIG. 2A have been omitted in the embodiment of FIG. 2B as in this illustrated embodiment it is not desired to provide the antenna beam signal of more than a single antenna to any one transceiver input. Accordingly, each antenna may be switchably coupled to any combination of transceiver inputs by switch matrix 280.

Referring again to FIG. 2A, it can be seen that the transmit signal path or forward link of the system is similar to that of the receive or reverse link. Accordingly, in order to couple the output of transceivers 240a–240m to selected ones of antennas 211a–211n, switch matrixes 221a–221n are disposed there between. In the preferred embodiment of FIG. 2A, any transceiver output signal may be coupled to any of antennas 211a–211n. Accordingly, n m×1 (m inputs and 1 output) switch matrixes 221a–221n are provided to couple any transceiver signal m to any of antennas n. The preferred embodiment illustrated in FIG. 2A utilizes signal splitters 231a–231m in order to couple the transceiver signal of each transceiver to multiple ones of the antennas. Of course, combinations of switch matrixes and/or splitters other than the discrete components illustrated in FIG. 2A may be utilized, if desired. Additionally, as described above with respect to the reverse link, the forward link may utilize delays in the signal paths of various ones of the antennas and/or various antenna diversity techniques, such as shown and described in the above-referenced patent application entitled "Diversity Among Multiple Antenna Beams," if desired. The use of delays, such as on the order of micro seconds for example, may be desirable to allow the MSU receiver to process signals from two antennas.

Also shown in FIG. 2A are duplexers 260a–260n. These duplexers are placed in the antenna signal paths in order to utilize a same antenna structure in both the forward and reverse links. For example, as shown in the embodiment of FIG. 2A, a single antenna may be deployed for each antenna of the plurality of antennas deployed throughout building 101, and a single cable coupled to BTS 210 for use in both the forward and reverse links. Of course, the duplexers may be disposed more near the antennas if desired, although such an embodiment would necessitate extended lengths of forward link and reverse link cabling from the BTS to the duplexers. Alternatively, separate antenna structure and/or connecting cables may be utilized in the forward and reverse links, if desired. For example, antennas deployed along the periphery of the service area may be utilized in the BTS reverse link in order to realize the above described advantages of power control and reduced interference and a centrally located antenna utilized in the forward link, i.e., a centrally located omni-directional forward link antenna may be deployed on each floor of building 101.

In operation, controller 270 will control selectable signal paths coupled thereto, such as the switch matrixes of FIG. 2A, in order to selectively couple ones of the antennas to ones of the transceivers. Accordingly, by monitoring communication attributes, such as received signal strength indicator (RSSI) for each communication on each of the antenna beams, or by receiving such information from coupled BTS components such as a scan receiver or cellular BTS controller, controller 270 may select a particular antenna to couple to a transceiver providing communication with an MSU.

For example, MSU 130b shown in FIG. 1 is disposed most near antenna 111b corresponding to antenna 211b of FIG. 2A. Accordingly, controller 270 of FIG. 2A may detect a strongest receive signal from MSU 130b at antenna 211b and therefore operate switch 220b to couple the antenna beam signal of antenna 211b to a particular transceiver operating on a channel consistent with that of MSU 130b. Where signal diversity is utilized, controller 270 may identify a second best antenna, i.e., a second antenna also having suitable attributes for communication according to the present invention, and couple the corresponding signal path to a diversity port of the particular transceiver operating on the channel consistent with that of MSU 130b. As MSU 130b moves about building 101, controller 270 will update the antenna assignments by manipulating the selectable signal paths coupled thereto in accordance with information regarding movement of MSU 130b.

Controller 270 is preferably a processor based system having a central processing unit and memory operating under control of an instruction set according to the present invention. For example, controller 270 may be a general purpose processor based system, such as a personal computer built on an INTEL 80X86 or PENTIUM processor platform, in information communication with BTS componentry as described herein and operating under control of a computer program to provide the functionality of the present invention. Of course, other forms of controller may be utilized if desired, such as dedicated control systems and/or utilizing a portion of a cellular BTS controller capacity, generally utilized in scanning signals and assigning/handing off communications, to provide the added control functionality of the present invention.

It shall be appreciated that the present invention may utilize any number of, or combination of, communication characteristics in selectively coupling antennas to transceivers and, therefore, the present invention is not limited to the above mentioned RSSI information in selecting antennas. For example, a signal to noise (S/N) ratio, carrier to interference (C/I) ratio, or bit error rate (BER) of a received and/or transmitted signal may be utilized in selecting an antenna. Additionally or alternatively, attributes which may be monitored outside of the communicated signals themselves may be utilized in selection of antennas, if desired. For example, MSU position information, such as may be determined by triangulation techniques involving ones of the plurality of antennas, may be utilized in selecting a particular antenna through which to provide wireless communications to an MSU.

Selective coupling of the transmit or forward link signal paths is preferably symmetric with that of the receive or reverse link. For example, a particular antenna or antennas may be selected for use in receiving communication signals from an MSU based on received signal attributes and this same antenna selected for transmitting communication signals to the MSU. Such a symmetric system is generally acceptable as an antenna determined to provide a best receive signal path is likely to provide similar link characteristics in the transmit signal path as well.

However, due to certain link conditions, such as the presence of multi-paths, i.e., signals reflected off of objects such as room partitions, floors, and furniture to arrive at an antenna at different times, selection of an antenna of one direction of a link based on the selection of another direction of the link may not always provide acceptable results. Accordingly, an alternative embodiment of the present invention monitors link characteristic information in each direction of the wireless link, such as may be provided with respect to a BTS transmitted signal attribute through a control loop from the receiving MSU, in selection of antennas utilized according to the present invention. It shall be appreciated that the present invention may utilize different antennas in the forward and reverse links by manipulating the selectable signal paths differently for each of the forward and reverse links.

Figure 3:
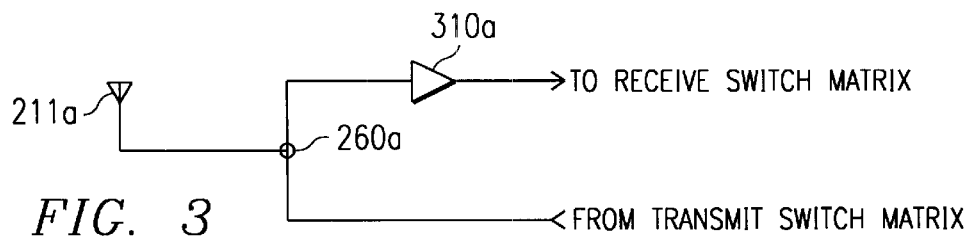
FIG. 3 shows a schematic diagram of a portion of the circuitry of FIG. 2A adapted according to an alternative preferred embodiment of the present invention.

As described above, the embodiment of FIG. 2A is a substantially passive system which is preferably utilized, at radio frequencies typically associated with cellular communications, when the longest distances between the antennas and transceivers are approximately 100 meters. Directing attention to FIG. 3, adaptation of the system of FIGS. 2A and 2B for deployment of antennas greater distances than may provide acceptable communication attributes in the substantially passive system described therein is shown. In the alternative embodiment of FIG. 3, an amplifier is disposed in the receive signal path at a point near ones of the antennas. Accordingly, as shown in FIG. 3 with respect to antenna 211a, duplexer 260a is disposed at a point near antenna 211a in order to provide a discrete transmit and receive signal path. Amplifier 310a is disposed in the receive signal path in order to provide a signal at a corresponding transceiver of BTS 210 with desired characteristics. Accordingly, ones of the antennas may be deployed greater distances, i.e., approximately 200 meters at radio frequencies typically associated with cellular communications, than may be possible with the substantially passive embodiments of FIGS. 2A and 2B.

It shall be appreciated that the use of amplifiers according to this alternative embodiment may be selective. For example, amplifiers may be deployed as shown in FIG. 3 for use with antennas 111c–114c and 111b–114b of FIG. 1 and not for use with antennas 111a–114a of FIG. 1 as antennas 111a–114a are disposed more near the transceivers of the associated BTS.

As cellular BTS communication equipment generally includes the use of amplifiers, such as linear power amplifiers (LPAs), in order to provide a transmitted signal with a desired signal strength, the preferred embodiment of the present invention does not utilize added amplification of the transmitted signals. Of course, where the amplitude of transmitted signals is not maintained at a desired level at the antennas of the present invention, amplification such as that shown in the receive signal path may be utilized if desired.

It shall be appreciated that manipulation of signal attributes according to this embodiment of the present invention is not limited to signal amplification as shown in FIG. 3. Additionally or alternatively the receive and/or transmit signal paths may include signal manipulation componentry such as filters, attenuators, interference cancelers, digital signal processors, and the like, where deemed advantageous.

Moreover, there is no limitation to the number of such devices utilized in a particular signal path according to the present invention. For example, although the spatial separation of an antenna and associated transceiver at radio frequencies commonly utilized for cellular communications is suggested to be approximately 200 meters, multiple ones of the amplifiers shown in FIG. 3 may be deployed in the signal path to extend such distances. As it is envisioned that the present invention is uniquely suited for deployment in structures, such as the aforementioned high rise office tower, deployment of multiple signal manipulation apparatus along the length of such signal paths may be readily accommodated in both environment, i.e., a service closet available on particular floors may be utilized, and utilities, i.e., necessary power connections may be present throughout the structure.

The embodiments of the present invention described above utilize a plurality of signal paths or cables in order to maintain discrete signals for coupling between antennas and transceivers according to the present invention. However, it may be desirable to reduce the number of such discrete signal paths in order to provide advantages such as simplified installation/maintenance and reduced cabling costs, including both the ability to utilize fewer cables and more affordably utilize less lossy although typically more expensive cables.

Figure 4:
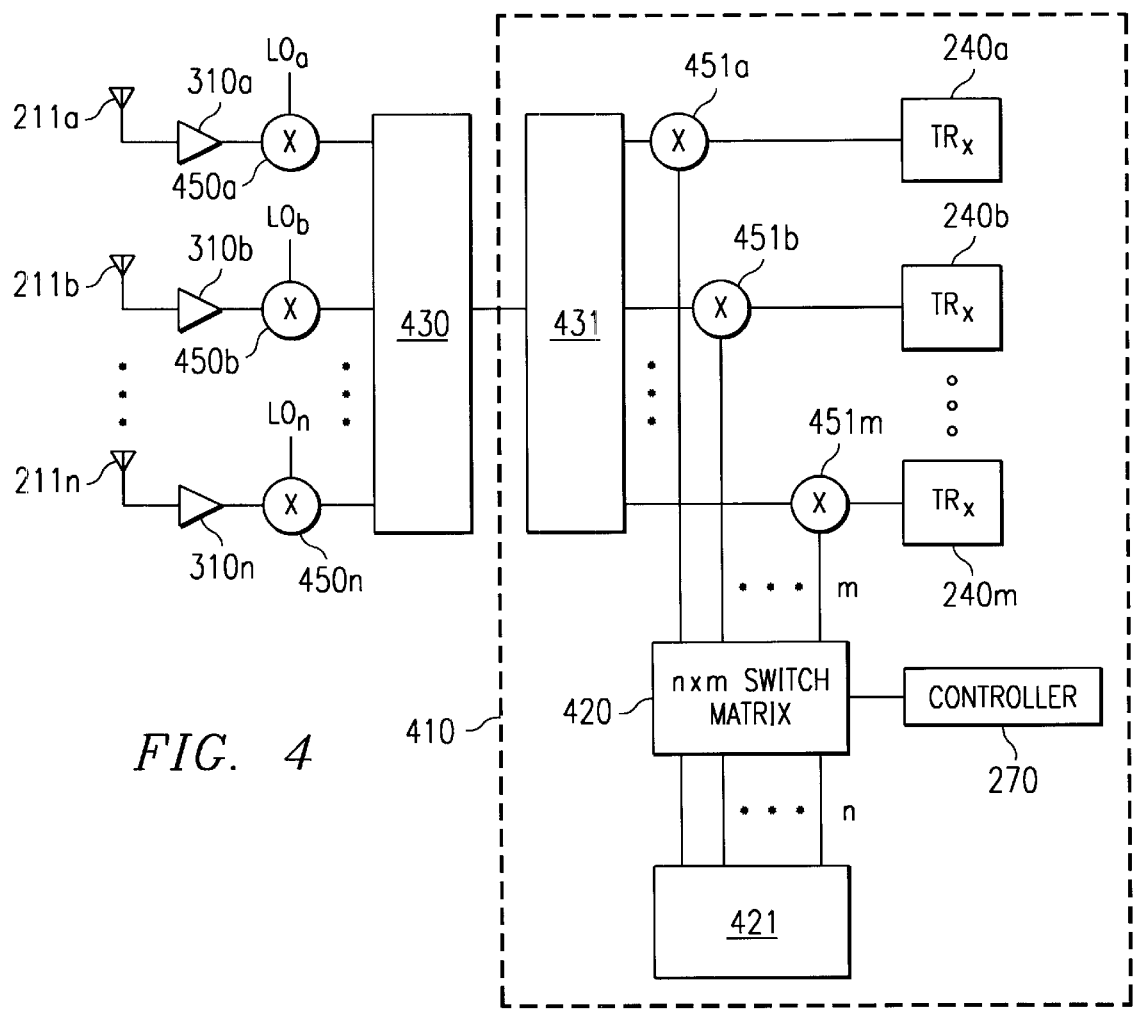
FIGS. 4–6 show schematic diagrams of alternative embodiments of communication circuitry adapted according to the present invention.

Directing attention to FIG. 4, a preferred embodiment utilizing fewer signal paths between the antennas and transceivers utilized according to the present invention is shown. According to this embodiment of the present invention, the signals of antennas of the plurality of antennas are composited for coupling to the BTS transceivers through a common signal path. However, in order to maintain the antenna beam signals as discrete signals when composited, the embodiment of FIG. 4 utilizes discrete intermediate frequencies (IFs) for signals to be composited. Specifically, antennas 211a–211n have mixers 450a–450n, respectively, associated therewith. By utilizing a local oscillator (LO) having a unique frequency for each antenna, i.e., LOa for antenna 211a, LOb for antenna 211b, and LOn for antenna 211n, the antenna beam signals for each antenna may be converted to a unique IF for signal compositing by combiner 430, shown here as an n×1(n inputs and 1 output) signal combiner. Accordingly, although maintained as discrete signals which may be recovered independently, a single cable may be utilized as a signal path between combiner 430 and BTS 410.

It shall be appreciated that, although a single combiner is shown for the antennas of FIG. 4, multiple such combiners may be utilized. For example, antenna beam signals may be composited in groups, such as antennas of a particular floor or group of floors may be composited by a combiner and the composite signal also composited with additional antenna beam signals in cascading fashion, if desired.

In order to provide a selected antenna beam signal to a particular transceiver, BTS 410 of FIG. 4 utilizes splitter 431, shown here as an 1×m (1 input and m outputs) splitter, coupled to mixers 451a–451m. LO generator 421, adapted to generate a plurality of frequencies corresponding to those utilized by mixers 450a–450n, is coupled to each of mixers 451a–451m through switch matrix 420. Accordingly, a particular antenna beam signal present in a corresponding unique IF may be selected for coupling to a desired transceiver by selectively coupling the appropriate LO frequency of LO generator 421 to the corresponding mixer. For example, if the antenna beam signal of antenna 211a is to be coupled to transceiver 240m, LOa as generated by LO generator 421 is coupled to mixer 451m by switch matrix 420 operating under control of controller 270. The use of a plurality of intermediate frequencies to provide multiple discrete signals through a common signal path and for their selection for provision to any of a number of associated interfaces is described in detail in the above referenced patent application entitled "System and Method for Frequency Multiplexing Antenna Signals," previously incorporated herein by reference.

It should be appreciated that, although shown only in the reverse link, the use of a reduced number of transmission cables between the antennas and BTS transceivers as shown in FIG. 4 may also be utilized in the forward link as well. For example, by replicating the circuitry of the receive signal path substantially as shown in FIG. 4 and coupling this circuitry to the transmit ports of the transceivers and to duplexers as shown in FIG. 2A, mixers in the transmit path at the BTS may be coupled to a selected LO frequency corresponding to a LO frequency of a selected antenna and, thus, the transceiver output signal may be selected for radiation by a selected antenna of the plurality of antennas. If more than one carrier is to be transmitted from a single antenna, the mixers associated with each of these transceiver output signals may be coupled to a same LO frequency corresponding to the desired antenna.

Additionally, it should be appreciated that the local oscillator frequencies utilized by the mixers at the antennas may be adjustable according to the present invention, such as under control of controller 270. For example, an IF associated with a particular antenna may be selectable by adjusting the LO utilized by the corresponding mixer. Accordingly, antenna beam signals may be combined by selecting a common LO for multiple ones of the antennas in the receive path. Likewise, a transceiver output signal may be simulcast from several antennas by having the LOs associated with antennas desired for transmission of the transceiver signal all tune to the same frequency.

Apparatus may be disposed in the signal paths in order to provide desired signal attributes. For example, as shown in FIG. 4, amplifiers, such as amplifiers 310a–310n disposed in the receive signal path, may be utilized to provide a signal of a desired amplitude. Additionally or alternatively other signal attribute components as described above may be utilized, if desired. For example filters may be disposed in the signal paths in order to filter image frequencies corresponding to the up-converters and down-converters and/or to filter the LO frequencies from the transmitted signals.

Figure 5:
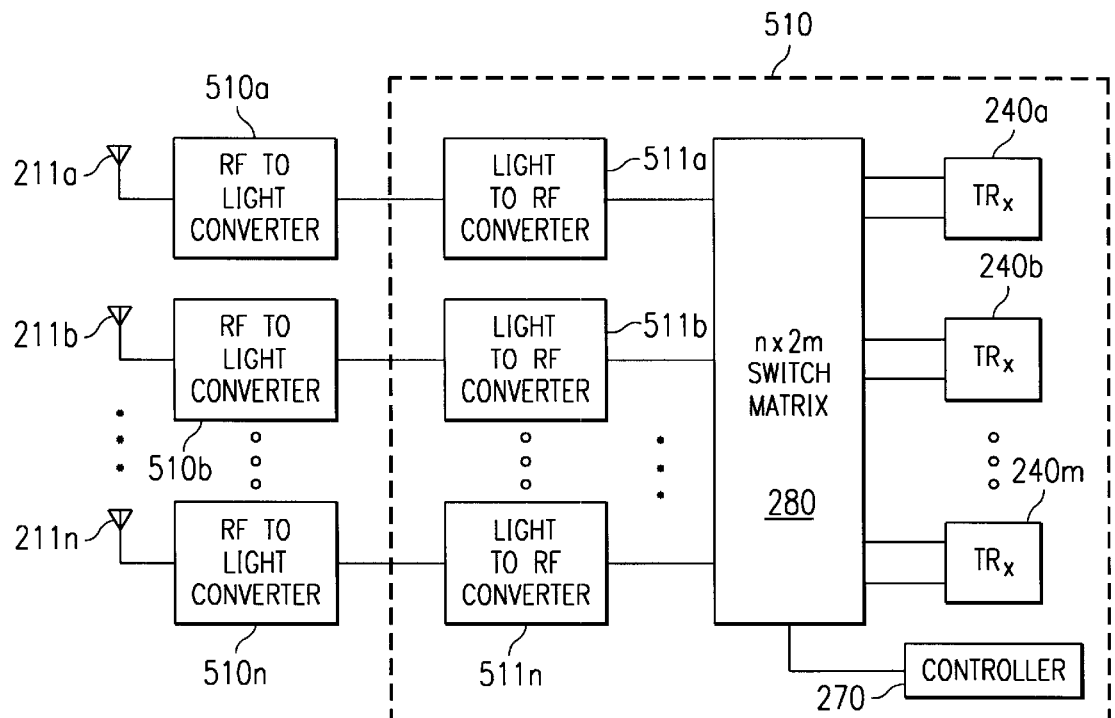

It shall be appreciated that frequency conversion of system native frequencies, such as down conversion of frequencies utilized by cellular communication systems to intermediate frequencies, may be useful in allowing for increased separation between the antennas and BTS transceivers utilized according to the present invention. For example, a lower cost cabling solution which is available for deployment in the above mentioned high rise office tower may be very lossy with respect to system native frequencies and, therefore, provide for only relatively short antenna/transceiver separation. However, this same cable may be substantially less lossy with respect to the lower frequencies of a selected IF and, therefore, allow for increased antenna/transceiver separation. Accordingly, in a preferred embodiment of the circuitry shown in FIG. 4, mixers 450a–450n operate to down-convert the antenna beam signals to an IF suitable for relatively lengthy transmission through the associated cable and mixers 451a–451m operate to up-convert the various IFs back to the system native frequencies. In a preferred embodiment wherein radio frequencies commonly utilized for cellular communications are utilized, the embodiment of FIG. 4 provides for antenna/transceiver separation on the order of approximately 200 meters and more.

Where separation between antennas and BTS transceivers utilized according to the present invention are greater than those providing desired signal attributes utilizing the above described embodiments, an alternative embodiment of the present invention allows for such spatially diverse deployments by converting the RF signals to lightwave signals and transmitting these signals along low-loss fiber. Conversion of the signals back to RF preferably occurs at the BTS wherein selectable signal paths may be utilized in coupling the signals to transceivers such as shown in FIGS. 2A and 2B. This alternative embodiment is shown in FIG. 5, wherein antennas 211a–211n are coupled to transceivers 240a–240m of BTS 510 through RF to light converters 510a–510n and light to RF converters 511a–511n, respectively, and switch matrix 280.

Figure 6:
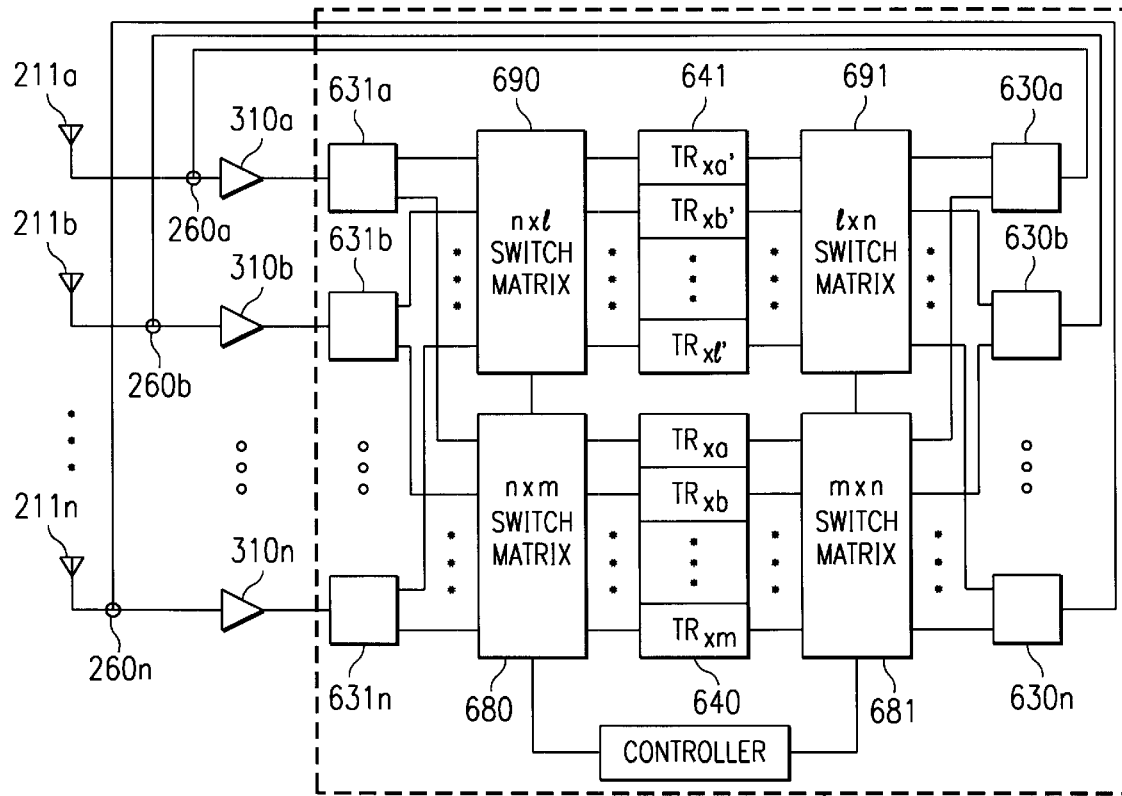

In order to provide added capacity within a particular service area, multiple BTSs and/or their associated transceiver equipment may be deployed according to the present invention. For example, circuitry as illustrated in any of the embodiments described above may be deployed for a particular subset of the floors of the aforementioned high rise office tower, with a second such system deployed for a second subset of the floors of the high rise office tower. Additionally, or alternatively, communication signals associated with the plurality of antennas deployed according to the present invention may be split and/or combined in order to be simultaneously provided to transceiver equipment of a second BTS or to transceiver equipment of an enlarged capacity BTS. This is illustrated in FIG. 6 as BTS 610 having transceiver set 640, possibly associated with a first cellular BTS, and transceiver set 641, possibly associated with a second cellular BTS. In operation, the antenna beam signals of antennas 211a–211n are split by signal splitters 631a–631n for coupling to each transceiver set through a corresponding switch matrix 680 and 690. It shall be appreciated that each of switch matrixes 780 and 790 may be controlled to provide a selected antenna beam signal to particular ones of the transceivers by controller 270 as described above. The signals transmitted by the transceivers are selectively coupled to antennas 211a–211n through a corresponding switch matrix 681 and 691, each operable under control of controller 270 as described above. In order to allow the signals of each transceiver set to be provided to a same antenna, signal combiners 630a–630n are provided in the transmit signal path.

Although reference has been made herein to transceiver equipment, it shall be appreciated that the concepts of the present invention are not limited to use only with transceivers. Accordingly, the use of the term transceiver as used herein is intended to include communication equipment which may receive, transmit, and/or receive and transmit.

Likewise, although reference has been made herein to the use of switch matrixes, it shall be appreciated that the present invention may utilize any number of selectable, configurable signal apparatuses or dynamically adjustable signal path networks. Accordingly, the present invention is not limited to any particular form of apparatus by the term Switch matrix.

Similarly, although the preferred embodiment has been described herein with reference to a MSU, it shall be appreciated that there is no limitation to operation of the present invention with mobile units. The principals of the present invention are operable with fixed or semi-fixed communication units as well as with mobile communication units. Indeed, a system of the present invention may be deployed in a building to provide not only mobile communications, but may also provide communication links for fixed or semi-fixed equipment, such as computer workstations or even a desktop telephone system.

It shall be appreciated that, although a preferred embodiment has been described herein with reference to disposal within a building, there is no limitation to the configuration of the service area according to the present invention. Accordingly, wireless communication services may be provided consistent with any desired area of coverage according to the principals of the present invention. For example, the present invention may be utilized to provide communications along a highway, such as within a tunnel, having insufficient wireless communication services provided thereto.

Additionally, it should be appreciated that, although represented as individual components in schematic diagrams presented herein, various ones of the components may be integrated. For example, the transceivers of FIG. 2A may be embodied in a single unit providing radio communication on various channels associated with the communication system operated according to the present invention. Likewise, the switch matrixes of the transmit or receive signal paths may be combined into a reduced number of switch matrixes providing selectable signal paths consistent with the operation of the communication as described above. Moreover, as particular embodiments may utilize duplexing to utilize a single set of antennas in both the forward and reverse links, alternative embodiments of the present invention utilize a single switch matrix assembly coupled to the transceiver equipment through duplexers in order to couple antennas to the transceivers according to the present invention.

Although the present invention and its advantages have been described in detail, it should be understood that various changes, substitutions and alterations can be made herein without departing from the spirit and scope of the invention as defined by the appended claims.

What is claimed is:

1. A system for providing wireless communication to a service area substantially within a building, said system comprising:

a plurality of antennas each having an antenna beam associated therewith disposed to provide substantially uninterrupted coverage of said service area with said antenna beams, wherein at least a first one of said antenna beams provides coverage of an area of a first floor of said building and at least a second one of said antenna beams provides coverage of an area of a second floor of said building;

a radio having a plurality of interfaces;

a down converter coupling each antenna to a common signal path, wherein antennas of said plurality are converted to employ a unique intermediate frequency for simultaneous discrete communication through said common signal path; and an up converter coupled to each interface of said plurality of interfaces, wherein each interface of said plurality of interfaces of said radio is in selectable communication with said each antenna of said plurality of antennas through selective conversion of an associated signal;

wherein selection of a particular antenna to place in communication with a particular interface of said radio is controlled at least in part by selecting an up-conversion mixing frequency associated with said particular interface corresponding to a down-conversion mixing frequency associated with said particular antenna.

2. The system of claim 1, further comprising:

an up-conversion mixing frequency generator generating a plurality of up-conversion frequencies; and a switch matrix coupled to said up-conversion mixing frequency generator wherein selection of said up-conversion mixing frequency for selection of a particular antenna to place in communication with a particular interface of said radio is accomplished through operation of said switch matrix.

3. The system of claim 1, wherein multiple antennas of said plurality of antennas are placed in communication with said particular interface of said radio at least in part by providing a common down-conversion mixing frequency associated with each said multiple antennas corresponding to a up-conversion mixing frequency associated with said particular interface.

* * * * *